United States Patent [19]

Baines

[11] Patent Number: 5,140,205
[45] Date of Patent: Aug. 18, 1992

[54] TEMPERATURE CONTROL IN AN ELECTRIC MOTOR

[75] Inventor: Roger F. Baines, Trumbull, Conn.
[73] Assignee: Johnson Electric S.A., Switzerland
[21] Appl. No.: 638,344
[22] Filed: Jan. 7, 1991
[30] Foreign Application Priority Data Jun. 5, 1990 [GB] United Kingdom ............... 9012536

[51] Int. Cl.⁵ .................... H02K 11/00; H02K 13/00
[52] U.S. Cl. .................. 310/68 C; 310/72; 310/239
[58] Field of Search .......... 310/68 C, 72, 220, 239; 318/473; 338/25; 361/27, 31, 105, 106

[56] References Cited

U.S. PATENT DOCUMENTS

| | | | |
|---|---|---|---|
| 2,473,485 | 6/1949 | Vickers | 310/68 C |
| 2,523,059 | 9/1950 | Richert et al. | 310/68 C |
| 3,048,722 | 8/1962 | Baron | 310/72 |
| 3,697,863 | 10/1972 | Kilner | 338/24 |
| 4,241,370 | 12/1980 | DeFilippis et al. | 361/24 |
| 4,387,412 | 6/1983 | Woods et al. | 361/27 |
| 4,408,244 | 10/1983 | Weible | 361/27 |
| 4,698,614 | 10/1987 | Welch et al. | 338/25 |
| 4,792,877 | 12/1988 | Thornton | 361/27 |
| 4,801,833 | 1/1989 | Dye | 310/239 |
| 4,823,064 | 4/1989 | Prager et al. | 318/473 |
| 4,896,067 | 1/1990 | Walther | 310/239 |
| 4,982,143 | 1/1991 | Gerschner et al. | 318/473 |
| 5,010,264 | 4/1991 | Yamada et al. | 310/68 C |

FOREIGN PATENT DOCUMENTS 1594334A 7/1981 United Kingdom.
2222730A 3/1990 United Kingdom.

Primary Examiner—Steven L. Stephan
Assistant Examiner—C. LaBalle
Attorney, Agent, or Firm—Ostrolenk, Faber, Gerb & Soffen

[57] ABSTRACT

An electric motor incorporates a positive temperature coefficient resistor 18 between a supply terminal and a brush. The resistor can be inserted from outside the motor through an aperture 17 in an end cap 2. A body 19 of heat conducting material, also insertable from outside the end cap, can be provided and held against to resistor 18 to alter its effective thermal mass and so adjust its operating characteristics.

19 Claims, 2 Drawing Sheets

TEMPERATURE CONTROL IN AN ELECTRIC MOTOR

BACKGROUND OF THE INVENTION

The present invention relates to temperature control in an electric motor, more particularly a fractional horsepower permanent magnet direct current (PMDC) motor having a positive temperature coefficient resistor in its electric circuit.

Small PMDC motors are often used in situations when they may be caused to stall while power is still applied to the motor. A high current passes through the motor while it is stalled and this can result in overheating of the motor components with risk of damage to the motor and the possibility of fire when the motor is used in confined spaces such as in automobiles.

Temperature sensitive switches using bimetallic contacts or the like can be used to break the motor circuit when the temperature rises to an unacceptable level. However, such switches require that the motor size be increased to accommodate them in the motor end cap, or a device may be placed on the outside of the motor where it is prone to damage.

BRIEF DESCRIPTION OF THE INVENTION

In accordance with the present invention, there is provided an electric motor having brushgear comprising a brush which bears on a commutator of the motor and an input terminal for supplying power to the brush, and an end cap surrounding the brushgear having an aperture, wherein a positive temperature coefficient resistor insertable through the aperture is electrically connected in series between the input terminal and the brush.

A body of heat conductive material may be arranged to be insertable through the aperture and held against the positive temperature coefficient resistor to increase where desired its effective thermal mass.

Under stall conditions, as the temperature of the positive temperature coefficient resistor and the surrounding motor parts increases due to the increased current flow, the resistance of the resistor will increase, thus increasing the resistance of the motor circuit and reducing or cutting off the current flow in the circuit. Positive temperature coefficient resistors are available with various characteristics and so, according to the invention, may be used selectively without changing the motor design, to match required working conditions of each motor.

Other, preferred, features and advantages of the invention will be apparent from the following description and the accompanying drawings.

BRIEF DESCRIPTION OF THE DRAWINGS

The invention will be further described by way of example only with reference to the accompanying drawings, in which.

DETAILED DESCRIPTION OF THE PREFERRED EMBODIMENT

Figure 1:
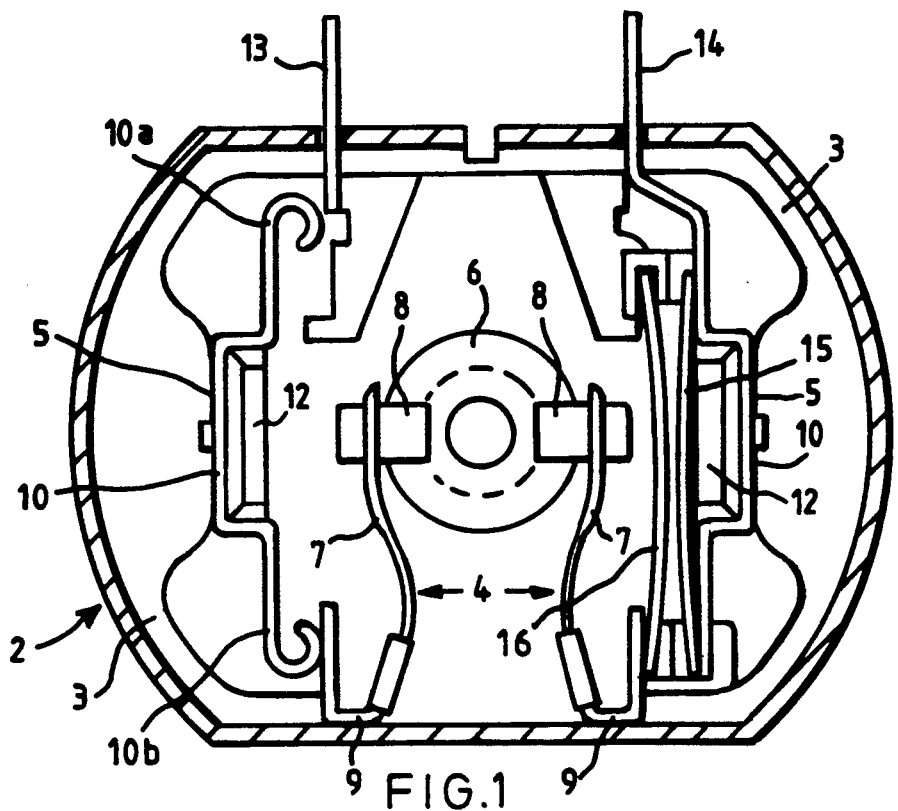
FIG. 1 is a sectional plan view of the inside of an end cap for a fractional horsepower PMDC motor embodying the invention.

A plastics end cap 2 has a peripheral wall 3 which is received inside the end of a motor casing (not shown). The end cap 2 carries brushgear including two brush brush assemblies 4 and terminal strips 5.

The end cap supports a bearing 6 for a motor shaft (not shown). The brush assemblies 4 each comprises a flexible strip 7 of, for example, beryllium—bronze, carrying a carbon brush 8 and a less resilient portion 9 of copper which is rivetted to the strip 7.

The terminal strips 5 extend across the end cap; each comprises a central portion 10 which is sandwiched between the wall 3 and a post 12. Portion 10 may be dimpled to ensure a tight fit between the wall 3 and post 12. At each end of one of the central portions 10 is a resilient arm 10a and 10b. The arm 10a contacts one power input terminal 13 of the motor.

The other power input terminal 14 is joined to a respective terminal strip 5 and to a resilient bowed conductive leaf 15, held in the end cap 2, extending past and inside the post 12. An opposing resilient bowed leaf 16, also held in the end cap 2, extends from and is in contact with a portion of the thermal body 19 as shown. In use, a positive temperature coefficient resistor fits between and is held in position by the leaves 15 and 16.

Figure 2:
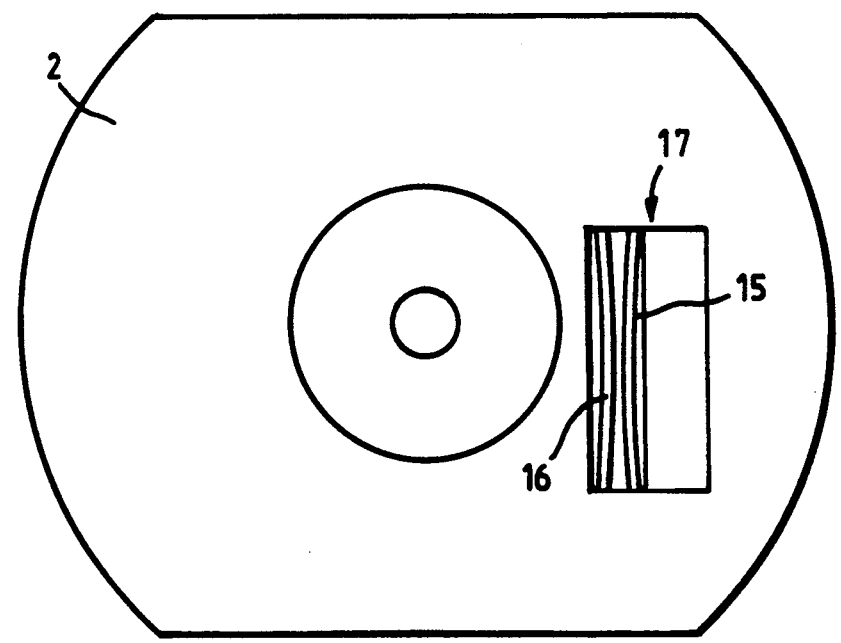
FIGS. 2 and 3 are plan outside views of the end cap.
Figure 3:
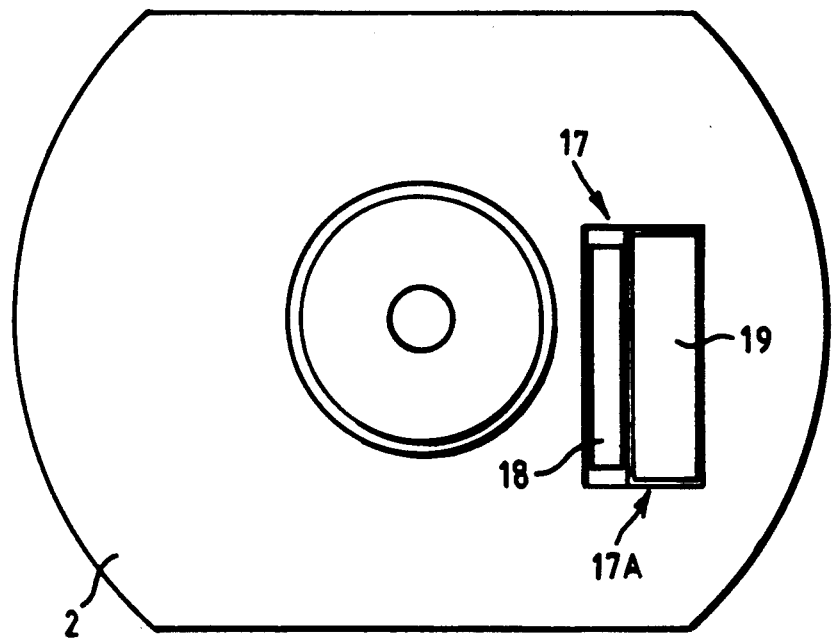
Figure 4:
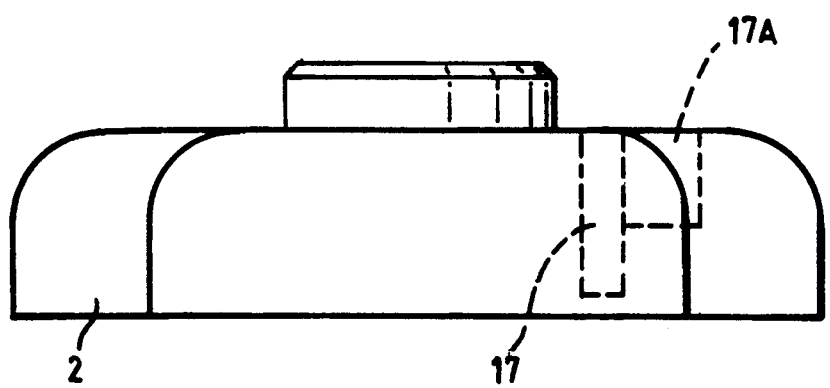
FIG. 4 is a top outside view of the end cap.

In FIGS. 2 and 3, the end cap 2 has an aperture 17 through which the leaves 15 and 16 can be seen in FIG. 2. As shown in FIG. 3, the aperture 17 is provided to receive a positive temperature coefficient (PTC) resistor 18 and at one side provides a housing 17A for the body 19 of heat conducting material. When in the position shown, the body 19 is held against part of one side of the PTC resistor 18, (as will be understood by the form of the aperture and housing seen in FIG. 4).

The described arrangement allows positive temperature coefficient resistors to be inserted without disassembly of the motor, for example to be replaced if required. It is also possible to insert PTC resistors 18 having different characteristics to match different motor operating requirements. But more importantly, the characteristic of each positive temperature coefficient resistor can be readily and easily altered by inserting a body 19 of chosen thermal mass in the housing 17A, again from outside the end cap 2 and without disassembly of the motor. Thus, to meet different requirements, such as a chosen cut-off time or the reset time of the positive temperature coefficient resistor 18, a body 19 of appropriate thermal mass is inserted in the housing 17A. For example the greater the thermal mass the later the cut-off time at any particular power load or overload applied in the circuit between the leaves 15 and 16. The thermal mass of the body 19 is dependent upon and can be adjusted by choosing the type of material it is formed of, its overall volume and its exposed or outer surface area. Further, its exposed surface may be corrugated or dimpled or otherwise shaped to increase its effective surface area and to increase its cooling rate when exposed to forced air currents for example. Thus, the body 19 may be formed with a large thermal mass to delay the normal cut-off time of the resistor 18 but arranged to cool comparatively quickly by having a large effective exposed surface area to reduce the period before the resistor re-sets and conducts current again.

As clear from the description, the motor design can remain unchanged and the same positive coefficient resistor 18 can be used for a number of different chosen characteristics, and particularly, the cut-off time and the reset period can easily and readily be changed, normally as between one motor and another, as a post-manufacturing procedure by selection of the type and form of the body 19.

One of the conductive leaves may be replaced by a fixed conductor, preferably although not necessarily, of planar form. In which case the resistor, together with a heat sink the thermal body where appropriate, is urged by the one resilient leaf against the fixed conductor to complete the series circuit between the input terminal 14 and the brush 8.

I claim:

1. An electric motor having brush gear, comprising:
   (A) a brush which bears on a commutator of the motor;
   (B) an input terminal for supplying power to the brush;
   (C) a PTC resistor;
   (D) means for coupling the PTC resistor in series between the input terminal and the brush; and
   (E) an end cap having an aperture extending therethrough through which the PTC resistor may be moved between a position outside the end cap and the coupling means.

2. An electric motor according to claim 1, further comprising:
   (F) a body of heat conducting material; and
   (G) means for holding the body of heat conducting material against the PTC resistor to increase the effective thermal mass of the PTC resistor;
   and wherein the aperture is so located that the body of heat conducting material may be moved through the aperture between a position outside the end cap and the holding means.

3. An electric motor according to claim 1, wherein the coupling means releasably holds the PTC resistor in series between the input terminal and the brush.

4. An electric motor according to claim 3, wherein the coupling means comprises:
   a conductor; and
   a resilient bowed conductive leaf mounted inside the end cap adjacent one side of the aperture to urge against one side of the PTC resistor to press the PTC resistor towards the conductor such that the PTC resistor is releasably held between the conductive leaf and the conductor.

5. An electric motor according to claim 4, in which the conductor comprises a second resilient bowed conductive leaf.

6. An electric motor according to claim 5, wherein the PTC element has two opposite faces and the two resilient bowed conductive leafs are pressed against opposite respective faces of the PTC resistor.

7. An electric motor according to claim 1, wherein the end cap surrounds the brush gear.

8. An electric motor according to claim 1, wherein the coupling means is mounted within the end cap and directly couples the PTC element in series between the input terminal and the brush.

9. An electric motor having a brush gear, comprising:
   (A) a brush which bears on a commutator of the motor;
   (B) an input terminal for supplying power to the brush;
   (C) means for coupling a PTC resistor in series between the input terminal and the brush when a PTC resistor is inserted into the coupling means; and
   (D) an end cap having an aperture extending therethrough through which a PTC resistor may be inserted into the coupling means from a position outside the end cap.

10. An electric motor according to claim 9, further including:
    (E) means for holding a body of heat conducting material such that when the PTC resistor is located in the coupling means and the body of heat conducting material is located in the holding means, the body of heat conducting material will be held against the PTC resistor to increase the effective thermal mass of the PTC resistor;
    and wherein the aperture is so located that the body of the heat conducting material may be inserted into the holding means through the aperture from a position outside the end cap.

11. An electric motor according to claim 9, wherein the coupling means is adapted to releasably hold the PTC resistor in place.

12. An electric motor according to claim 11, wherein the coupling means comprises:
    (A) a conductor; and
    (B) a resilient bowed conductive leaf mounted inside the end cap adjacent one side of the aperture, the conductive leaf being adapted to press the PTC resistor against the conductor when the PTC resistor is located in the coupling means such that the PTC resistor is releasably held between the conductive leaf and the conductor.

13. An electric motor according to claim 12, in which the conductor comprises a second resilient bowed conductive leaf.

14. An electric motor having brush gear, comprising:
    (A) a brush which bears on a commutator of the motor;
    (B) an input terminal for supplying power to the brush;
    (C) means for coupling a PTC resistor in series between the brush and the input terminal when a PTC resistor is placed in the holding means; and
    (D) an end cap having an aperture formed therein through which the PTC resistor may be moved between a position outside the end cap and the coupling means, the coupling means including two conductive leaves coupled to the input terminal and the brush, respectively, the conductive leaves being located on respective opposite sides of the aperture for releasably receiving therebetween a PTC resistor insertable through the aperture from outside the end cap to complete a series connection between the input terminal and the brush.

15. An electric motor according to claim 14, further including:
    (E) second means for holding a body of heat conductive material against the PTC resistor when the PTC resistor and the body are located in the coupling means and the holding means, respectively, to increase the effective thermal mass of the PTC resistor; the aperture being so located that the body may be moved through the aperture between a position outside the end cap and the holding means.

16. An electric motor according to claim 14, wherein said end cap surrounds the brush gear.

17. An electric motor having brush gear, comprising:

(A) a brush which bears on a commutator of the motor;

(B) an input terminal for supplying power to the brush;

(C) means for coupling a PTC resistor in series between the brush and the input terminal when a PTC resistor is placed in the coupling means; and (D) an end cap having an aperture formed therein through which the PTC resistor may be moved between a position outside the end cap and the coupling means; the holding means including a resilient conductive leaf held in the end cap and extending along one side of the aperture and being electrically connected to the input terminal and an opposing leaf held in the end cap and extending along an opposite side of the aperture.

18. An electric motor according to claim 17, further including a PTC resistor located in the coupling means.

19. An electric motor according to claim 17, further including second means for holding the body of heat conducting material against the PTC resistor when the PTC resistor and the body are located in the coupling means and the holding means, respectively, to increase the effective thermal mass of the PTC resistor, the aperture being so located that the body may be moved through the aperture between a position outside the end cap and the holding means.

* * * * *